United States Patent [19]

Knaak

[11] Patent Number: 4,896,329
[45] Date of Patent: Jan. 23, 1990

[54] LASER DYE LIQUIDS, LASER DYE INSTRUMENTS AND METHODS

[75] Inventor: Lawrence E. Knaak, Dayton, Ohio

[73] Assignee: Exciton Incorporated, Dayton, Ohio

[21] Appl. No.: 360,082

[22] Filed: Jun. 1, 1989

[51] Int. Cl.$^4$ .............................................. H01S 3/20
[52] U.S. Cl. ..................................................... 372/53
[58] Field of Search .................................... 372/51, 53

[56] References Cited

U.S. PATENT DOCUMENTS 4,562,580 12/1985 Fletcher et al. ...................... 372/53

Primary Examiner—William L. Sikes
Assistant Examiner—Robert E. Wise
Attorney, Agent, or Firm—Wood, Herron & Evans

[57] ABSTRACT

Disclosed are laser dye liquids, lasers utilized therewith and methods of formulating the laser dye liquids. A laser dye liquid of the present invention comprises a laser dye dissolved in a glycol ether solvent which is substantially free of solubilizing and viscosity altering additives, and which does not substantially interfere with the emission of coherent laser radiation when the laser dye liquid is excited by a pump source. Preferred glycol ether solvents of the instant invention are ethylene glycol phenyl ether (EPH) and propylene glycol phenyl ether (PPH). The laser dye liquids of the present invention are especially suited for use with jet stream dye lasers.

16 Claims, No Drawings

LASER DYE LIQUIDS, LASER DYE INSTRUMENTS AND METHODS

FIELD OF THE INVENTION

This invention relates to laser dye liquids comprising a laser dye dissolved in a glycol ether solvent for emitting coherent laser radiation when the laser dye liquid is excited by an optical pump source, laser dye instruments in combination therewith, and methods for formulating the laser dye liquids.

BACKGROUND

A laser is a light-amplifying device capable of inducing high intensity coherent monochromatic light concentrated in a well-collimated beam, commonly referred to as a laser beam. A typical laser comprises an optical resonator having a laser-active material, i.e., a laser medium, that can be in the form of a solid, liquid or gas. When the laser medium is a liquid, it typically is in the form of a laser dye solution which comprises a laser dye dissolved in a solvent or a combination of solvents. In operation of a laser, the laser medium's atoms or molecules are pumped with sufficient energy to exceed a threshold energy value such that laser action is induced. Such photons trigger other molecules to emit similar photons prematurely, and together they form the laser beam.

Even though lasers have a wide variety of uses in such diverse areas as drilling, spectroscopy, welding, cutting, communication, analysis, surgery, and photochemistry, they normally can function only in a small portion of the light spectrum since they are dependent upon the laser media because the wavelengths emitted by a specific energy transition in a given laser medium is tunable over only a very limited portion of the light spectrum. It is therefore necessary to provide a number of different laser media in order to enable lasers to operate over the entire light spectrum. Further, many of the laser media available up to now have been solids or gases. But, traditionally it has been recognized that laser dye solutions can provide advantages not possible with gas or solid laser media. For example, there are several laser dye solutions known that are tunable over a relatively broad range of wavelengths. Also, the laser output from laser dye solutions can be tuned to a specific wavelength selected from a range of wavelengths. Tunability is a clear advantage over gaseous or solid laser media which typically emit at a single wavelength. Further, a single laser dye instrument can emit laser beams at a wide range of different wavelengths from the ultraviolet to the near infrared simply by changing to another laser dye liquid.

Laser dye solutions, however, are not without their shortcomings and disadvantages. One significant problem, for example, is the limited number of solvents or solvent combinations available for commercial use with jet stream dye lasers. This drawback unfortunately limits the selection of laser dyes for jet stream dye lasers to those which dissolve in the few solvents that are available in order to form effective laser dye solutions.

In the case where a laser dye solution is employed with a jet laser system, the laser dye solution is pumped through a nozzle with sufficient pressure to create a ribbon of dye solution upon which the pump source beam impinges. The use of a jet stream dye laser offers the advantage of a high output over a wide tuning range being pumped by, for example, argon-ion, krypton-ion, and Nd:YAG lasers as well as others. The use of jet stream dye lasers to produce dye jets, i.e., streams of carrier solvents containing dyes, requires utilization of viscous solvents. Viscous solvents provide for damping of surface waves produced by pressure fluctuations, irregularities in the nozzles and high laminar flow velocities which damping enhances the system's efficiency. One prior art solvent generally accepted for use in a jet stream laser is ethylene glycol (viscosity of approximately 20 centipoises at about 20° C.) which typically is utilized by itself, or in combination with other solvents, in order to dissolve various laser dyes.

When utilizing an argon-ion or krypton-ion pumped jet stream dye laser, there are only a limited number, e.g., approximately fifteen or so, laser dyes available which have been generally accepted for use because ethylene glycol has been considered the base solvent of choice for the jet laser system. In other words, use of that solvent restricts the dye choice to those which have solubility either in ethylene glycol itself, or in a combination of solvents where one component is an additive that helps to solubilize the dye sufficiently so that it may be incorporated into the ethylene glycol. Of the laser dyes utilized today, however, it is believed only two are commercially used directly in ethylene glycol whereas the remainder require a combination of solvents to enhance their ease of dissolution. In the latter case, benzyl alcohol, propylene carbonate, dimethylsulfoxide, and methanol are examples of solubilizing enhancers employed to help solubilize the laser dyes in the ethylene glycol.

The solubilizing additives present further disadvantage of their own. For instance, the solubilizing additives are relatively low viscosity solvents typically requiring the addition of viscosity raising additives when used so their use in a jet stream laser may be limited. Furthermore, some of the solubilizing additives are somewhat hygroscopic which is detrimental due to the fact they tend to cause the solvent to take up water vapor from the atmosphere which reduces its viscosity and, therefore, its effectiveness in a jet stream laser. Still further, in some cases, such as with dimethylsulfoxide, the solubilizing agents are absorbed through skin presenting potentially hazardous health risks to personnel handling the laser dye solutions in which such solubilizing agents have been incorporated. And other solubilizing agents, such as propylene carbonate, tend to absorb the pumped light especially in the ultraviolet region which causes a loss in overall efficiency of the jet stream laser.

Consequently, it is the primary objective of this invention to provide new and improved commercially effective laser dye liquids comprising versatile solvents that are capable of dissolving a wide range of laser dyes without the need for solubilizing or viscosity altering additives, which do not interfere with the emission of coherent laser radiation when the laser dye liquids are pumped, and which are particular suited for use with jet stream lasers.

SUMMARY OF THE INVENTION

A novel laser dye liquid of the present invention comprises a laser dye dissolved in a glycol ether solvent. It has been unexpectedly discovered that glycol ether solvents have surprising versatile capability for effectively dissolving several different laser dyes without the need for solubilizing or viscosity altering agents.

Moreover, it has been unexpectedly discovered that glycol ether solvents can be used to form effective laser dye liquids which do not substantially interfere with the emission of coherent laser radiation when such laser dye solutions are excited by pumping light sources.

Preferably, the glycol ether solvents utilized should have a viscosity of at least about 10 centipoises at about 25° C. In addition, it is preferred that the glycol ether solvents absorb water vapor in amounts typically no greater than about 2% at 21° C. so that laser system problems caused by water vapor absorption from the atmosphere are virtually eliminated.

While the novel laser dye liquids comprising a laser dye dissolved in a glycol ether solvent are suitable for use in dye lasers pumped by argon-ion, krypton-ion, and Nd:YAG lasers and the like, it also has been discovered that they are especially suited for use in jet stream dye lasers. Notwithstanding the highly viscous nature of glycol ether solvents, they can be combined with other solvents or solubilizing and viscosity altering additives, if desirable or necessary, to form base solvents for laser dye liquids.

Thus, the novel laser dye liquids and lasers of the present invention provide what has been heretofore unavailable. That is, the formation of several effective laser dye liquids comprised of different laser dyes in glycol ether solvents in optimal concentrations without solubilizing or viscosity altering additives. As a result, the formation of a laser dye liquid, e.g. a jet stream laser, is no longer limited to the laser dye's solubility in, e.g. ethylene glycol, and the toxic and light absorbing problems associated with the use of solubilizing and viscosity raising additives can now be eliminated. The present invention, therefore, provides the laser user with greater flexibility in the selection of laser dyes and formation of effective laser dye liquids, particularly for use with jet stream lasers.

The above features and advantages of the present invention will be better understood with reference to the detailed description. It should also be understood that the laser dye liquids and lasers of the present invention are exemplary only and not to be regarded as limitations of the invention.

DETAILED DESCRIPTION OF THE INVENTION

By way of illustrating and providing a more complete appreciation of the present invention, and many of the attendant advantages thereof, the following detailed description discloses the novel laser dye liquids, lasers used therewith, and methods of making the laser dye solutions.

The present invention is directed to a class of laser dye liquids suitable for use with lasers without requiring the use of solubilizing and viscosity raising additives. A laser dye liquid of the present invention comprises a laser dye dissolved in a glycol ether solvent. The glycol ether solvents of the instant invention should have a viscosity of at least about 10 centipoise at about 25° C. It is preferable, however, that the glycol ether solvents of the present invention have a viscosity in the range of between at least about 5 centipoises to about 50 centipoises at a temperature in the range of between about 0° C. to about 60° C.

The glycol ether solvents contemplated by the present invention are represented by the following general formula:

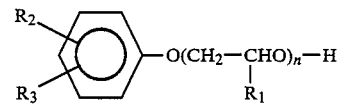

Possible substituents for $R_1$ includes hydrogen or a lower alkyl having 1 to about 10 carbons. Possible substituents for $R_2$ includes hydrogen or a lower alkyl having 1 to about 10 carbons, aryloxy (Ar—O—), arylalkoxy (Ar—CH$_2$—O—), hydroxyalkoxy (HO—(CH$_2$)$_m$—0—) wherein m is 2, alkoxy (RO—) wherein R includes as possible substituents $C_1$ to $C_5$, and amido

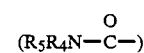

wherein $R_4$ and $R_5$ may be identical or different and may include as possible substituents hydrogen or a lower alkyl having 1 to about 5 carbons. Possible substituents for $R_3$ are the same as those enumerated for $R_2$; however, it should be understood that the substituents for $R_2$ and $R_3$ may be identical or different in the same molecule for any glycol ether solvent. With respect to n, it is 1 to about 3.

Examples of glycol ether solvents contemplated by the instant invention include Hydroquinone bis(2-hydroxyethyl), ether, 3-(2-ethylphenoxy)-1,2-propanediol, 2-(4-tert-pentyl)phenoxy) ethanol, 1-(4-tert-butyl)phenoxy)-2-propanol, 2-(2,6-diisopropylphenoxy)-ethanol, 1-(2-benzylphenoxy)-2-propanol, and 1-(4-(benzyloxy)-phenoxy)-2-propanol, all of which are available from the Adrich Chemical Company, Inc. Notwithstanding, the preferred glycol ether solvents of the present invention are ethylene glycol phenyl ether having the following formula

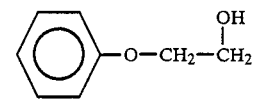

and propylene glycol phenyl ether having the following formula

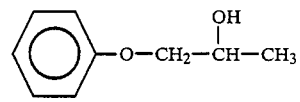

Ethylene glycol phenyl ether and propylene glycol phenyl ether both can be purchased from Dow Chemical marketed under the trademark Dowenol and identified as EPH or PPH, respectively.

Examples of aser dyes which can be dissolved in at least one of the glycol ether solvents, such as EPH and PPH, are Stilbene 420 (2,2'-([1,1'-biphenyl]-4,4'-diyldi-2,1-etheneidyl)bis-benzenesulfonic acid disodium salt), Coumarin 480 (2,3,6,7-tetrahydro-9-methyl-1H,5H,11H-[1]benzopyrano[6,7,8-ij]quinolizin-11-one), Coumarin 535 (3-(1H-benzimidazol-2-yl)-7-(diethylamino)-2H-1-benzopyran-2-one), Coumarin 540 (3-(2-benzothiazolyl)-7-(diethylamino)2H-1-benzopyran-2-one), Rhodamine 560 Chloride (2-(6-amino-3-imino-3H-xanthen-9-yl)-benzoic acid, monohydrochloride), Rhodamine 590 Chloride (2-[6-(ethylamino)-3-

(ethylimino)-2,7-dimethyl-3H-xanthen-9-yl]-benzoic acid, ethyl ester), chloride, Rhodamine 590BF₄ (2-[6-(ethylimino)-3-(ethylimino)2,7-dimethyl-3H-xanthen-9-yl]-benzoic acid, ethyl ester), tetrafluroborate, Rhodamine 590 ClO₄ (2-[6-(ethylamino)-3-(ethylimino)2,7-dimethyl-3H-xanthen-9-yl]-benzoic acid, ethyl ester), perchlorate, Kiton Red 620 (N-[6-(diethylamino)-9-(2,4-disulfophenyl)-3H-xanthen-3-ylidene]-N-ethylethanaminium hydroxide, inner salt), DCM ([2-[2-[4-(dimethylamino)phenyl]ethenyl]-6-methyl-4H-pyran-4-ylidene]-propanedinitrile), LDS 698 (2-[4-[4-(dimethylamino)phenyl]-1,3butadienyl]-1-ethyl-pyridinium monoperchlorate), LDS 722 (4-[4-[4-(dimethylamino)-phenyl]-1,3butadienyl]-1-ethyl-pyridinium perchlorate), LDS 751 (C₂₅H₃₀N₃.ClO₄), LDS 820 (2-[6-[4-(dimethylamino)phenyl]-1,3,5-hexatrienyl]-3-ethyl-benxothiaxolium perchlorate), LDS 925, LD 700 ClO₄ (2,3,6,7,12,13,16,17-octahydro-9-(trifluoromethyl)-1H,5H,11H,15H,-xantheno[2,3,4ij:5,6,7-ij']diquinolizin-4-ium perchlorate), Oxazine 750 (2,3,6,7-tetrahydro-5-(ethylimino)1H,5H-benzo[a]phenoxazin-[8,9,10-ij]quinolizin perchlorate), all of which are availablefrom Exciton, Inc., Dayton, Ohio. It should of course be understood that other laser dyes which can be dissolved in or combined with these or other glycol ether solvents are also contemplated within the scope of the present invention. It is also contemplated by the instant invention that while the laser dyes may be directly dissolved into or combined with a glycol ether solvent, they may be dissolved in or combined with any suitable blends of such solvents.

Referring now to the solubility data in Table I, a comparison of the solubility of the laser dyes in EPH and PPH to those solvents normally used indicate that with minimal exception most of the laser dyes compared can be used directly in one or both of the glycol ether solvents without the need for solubilizing or viscosity altering additives. In the cases where the minimum required solubility cannot be achieved, one of the normal solubilizing or viscosity altering agents can be utilized to effect dissolution.

Examples of potential solubilizing agents that can be used with the glycol ethers of the present invention include, but are not limited to, ethylene glycol, benzyl alcohol, dimethylsulfoxide, methanol, glycerine and the like. Examples of viscosity raising additives that can be used include glycerine, polyethylene glycol and polypropylene glycol.

Among the group of dyes listed in Table I, DCM and LDS 751 have been a particular problem in the past to keep in solution in ethylene glycol or glycerine based solvent formulations. As noted in Table I, different solvent systems are indicated for these two dyes. Surprisingly, however, DCM dissolved easily in EPH and, even more surprisingly, it stayed in solution. Also surprisingly, LDS 751 dissolved in EPH. With solvent combinations available hitherto, the LDS 751 will not stay in solution, i.e., a mixture of 15% propylene carbonate and 85% ethylene glycol does not keep this dye in solution. It comes out after a period of time or upon cooling the solution.

TABLE I

| Dye | Solvent System Recommended | Dyes Currently Used Under Argon-ion & Krypton-ion Pumping Solubility (gms./liter) EPH | PPH | Required Concentration gms./liter | and/or millimolar |
|---|---|---|---|---|---|
| Stilbene 420 | EG | 14 | — | 0.844 | 1.5 |
| Coumarin 480 | BzOH/EG:2/8 | 83 | 68 | 1.28 | 5 |
| Coumarin 535 | BzOH/EG:2/3 | 13 | 4.3 | 1.00 | 3 |
| Coumarin 540 | BzOH/EG:2/3 | 5.3 | 3.6 | 0.421 | 1.2 |
| Rhodamine 560 Chloride | EG | 12.7 | 1.7 | 0.459 | 1.25 |
| Rhodamine 590 Chloride | MeOH/EG:1/49 | 16 | 33.3 | 0.958 | 2. |
| Kiton Red 620 | MeOH/EG:1/49 | 10.5 | 13.6 | 3.02 | 5.2 |
| DCM | BzOH/DMSO/G:1/1.5/1.5 or PC/EG:2:3 | 2.6 | 1.4 | 0.455 | 1.5 |
| LDS 698 | PC/EG:15/85 | 8.6 | 1.1 | 0.455 | 1.2 |
| LDS 751 | PC/EG:15/85 | 2.2 | 0.7 | 0.891 | 2 |
| LDS 821 | PC/EG:15/85 | 2.3 | 1.1 | 1.03 | 2 |
| LD 700 | MeOH/EG:1/49 | 99 | 54 | 0.862 | 1.6 |
| Oxazine 750 | DMSO/EG:18/82 | 11 | 0.7 | 0.705 | 1.5 |
| HITC Perchlorate | DMSO/EG:16/84 | 0.22 | 0.12 | 0.377 | 0.74 |
| IR 140 | DMSO/EG:20/80 | 0.36 | 0.24 | 0.779 | 1.0 |

Solvents: EG (ethylene glycol), BzOH (benzyl alcohol), DMSO (dimethylsulfoxide), G (glycerin), MeOH (methanol), EPH (ethylene glycol phenyl ether), PPH (propylene glycol phenyl ether); solvents' ratios are given by volume.

The dyes of this invention can be stimulated, i.e., "pumped," with the aid of energy sources by means of, for example, electrons or light. Examples of optical pumps include gas lasers such as nitrogen, argon-ion and krypton-ion lasers, and metal vapor lasers, and solid state lasers. A jet stream dye laser typically comprises a pump source, a reservoir containing a laser dye solution, and a nozzle, wherein the laser dye solution is pumped through the nozzle with sufficient pressure to create a ribbon dye solution upon which a pumped laser beam generated from said pump source impinges. While it is preferred to use the laser dye solution with jet stream dye lasers, other types of laser systems not inconsistent with the teachings of this invention may also be employed.

The present invention may, of course, be carried out in other specific ways than those herein set forth without departing from the spirit and essential characteristics of the invention. The present embodiments are, therefore, to be considered in all respects as illustrative and not restrictive, and any changes coming within the meaning and equivalency range of the appended claims are to be embraced therein.

Having described in detail the embodiments of my invention, what I desire to claim and protect by Letters Patent is:

1. A laser dye liquid for emitting coherent laser radiation when excited by a pumping light source, said laser dye liquid comprising a laser dye mixed with a glycol ether solvent.

2. A laser dye liquid of claim 1, said glycol ether solvent having a viscosity of at least about 10 centipoises at about 25° C.

3. A laser dye liquid of claim 1, said glycol ether solvent absorbing water vapor in an amount of no greater than about 2% at about 21° C.

4. A laser dye liquid of claim 1, said laser dye solution being substantially free of a viscosity altering additive.

5. A laser dye liquid of claim 1, said laser dye solution being substantially free of a solubilizing additive.

6. A laser dye liquid of claim 1 wherein said laser dye liquid does not substantially interfere with the emission of coherent laser radiation when said laser dye liquid is excited by a pumping light source.

7. A laser dye liquid of claim 1, said glycol ether solvent having the general formula:

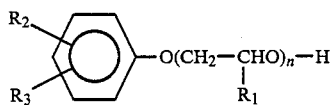

wherein n is 1 to about 3
$R_1$ is hydrogen or a lower alkyl
$R_2$ or $R_3$ is a hydrogen or lower alkyl, aryloxy, arylalkoxy, hydroxyalkoxy, alkoxy, and amido, wherein $R_2$ and $R_3$ are similar or dissimilar.

8. A laser dye liquid of claim 1 wherein said glycol ether solvent is ethylene glycol phenyl ether.

9. A laser dye liquid of claim 1 wherein said glycol ether solvent is propylene glycol phenyl ether.

10. A laser dye liquid of claim 1, said laser dye being selected from the group consisting of Stilbene 420, Coumarin 480, Coumarin 535, Coumarin 540, Rhodamine 560 Chloride, Rhodamine 590 Chloride, Rhodamine 590 $BF_4$, Rhodamine 590 $ClO_4$, Kiton Red 620, DCM, LDS 698, LDS 722, LDS 751, LDS 820, LDS 925, LD 700 $ClO_4$, and Oxazine 750.

11. A dye laser comprising:
a pump source associated with a resonant cavity, dye circulator, and reservoir; and
a laser dye liquid present in said reservoir for lasing, said pump source having the ability to excite said laser dye liquid, said laser dye liquid comprising a laser dye mixed with a glycol ether solvent which does not substantially interfere with the emitted coherent laser radiation when said laser dye liquid is pumped.

12. A dye laser of claim 11 wherein the glycol ether solvent is ethylene glycol phenyl ether.

13. A dye laser of claim 11 wherein the glycol ether solvent is propylene glycol phenyl ether solvent.

14. A dye laser of claim 11, comprising
a jet stream system having a nozzle wherein the laser dye liquid is pumped through said nozzle with sufficient pressure to create a ribbon of laser dye liquid having optical quality upon which a pumped laser beam generated from said pump source impinges.

15. A method for producing a laser dye liquid which does not substantially interfere with coherent laser radiation when the laser dye liquid is pumped by a pump source, said method comprising the step of:
mixing a laser dye in an effective amount with a glycol ether solvent to produce the laser dye liquid.

16. A method of claim 15, the glycol ether solvent being selected from the group consisting of ethylene glycol phenyl ether and propylene glycol phenyl ether.

* * * * *

UNITED STATES PATENT AND TRADEMARK OFFICE
CERTIFICATE OF CORRECTION

PATENT NO. : 4,896,329
DATED : January 23, 1990
INVENTOR(S) : Lawrence E. Knaak

It is certified that error appears in the above-identified patent and that said Letters Patent is hereby corrected as shown below:

Column 2, line 59 delete "particular" and insert --particularly--

Column 4, line 57 delete "aser" and insert --laser--

Column 4, line 62 the underlines are missing

Column 5, line 45 delete "availablef" and insert --available--

Signed and Sealed this

Twenty-fifth Day of June, 1991

Attest:

HARRY F. MANBECK, JR.

Attesting Officer

Commissioner of Patents and Trademarks